(12) United States Patent
Yoshioka et al.

(10) Patent No.: US 9,726,118 B2
(45) Date of Patent: Aug. 8, 2017

(54) EXHAUST GAS RECIRCULATION APPARATUS FOR ENGINE

(71) Applicants: Mamoru Yoshioka, Nagoya (JP);
Shinichiro Nogawa, Mishima (JP);
Yasuyuki Irisawa, Susono (JP);
Hiroyuki Hokuto, Numazu (JP)

(72) Inventors: Mamoru Yoshioka, Nagoya (JP);
Shinichiro Nogawa, Mishima (JP);
Yasuyuki Irisawa, Susono (JP);
Hiroyuki Hokuto, Numazu (JP)

(73) Assignees: AISAN KOGYO KABUSHIKI KAISHA, Obu-Shi (JP); TOYOTA JIDOSHA KABUSHIKI KAISHA, Toyota (JP)

(*) Notice: Subject to any disclaimer, the term of this patent is extended or adjusted under 35 U.S.C. 154(b) by 675 days.

(21) Appl. No.: 13/897,873

(22) Filed: May 20, 2013

(65) Prior Publication Data
US 2013/0312718 A1 Nov. 28, 2013

(30) Foreign Application Priority Data
May 24, 2012 (JP) .................... 2012-118632

(51) Int. Cl.
*F02B 47/08* (2006.01)
*F02M 25/07* (2006.01)
(Continued)

(52) U.S. Cl.
CPC ..... *F02M 25/0771* (2013.01); *F02B 29/0437* (2013.01); *F02M 26/05* (2016.02);
(Continued)

(58) Field of Classification Search
USPC .............. 123/568.21, 568.13, 193.5, 41.79
See application file for complete search history.

(56) References Cited

U.S. PATENT DOCUMENTS 7,107,770 B2 9/2006 Shirakawa
2005/0028797 A1* 2/2005 Janssen et al. .......... 123/568.26
(Continued)

FOREIGN PATENT DOCUMENTS

CN 1661222 A 8/2005
JP 2000-205004 A 7/2000
(Continued)

OTHER PUBLICATIONS

Machine Translation of JP2011111951A PDF File Name: "JP2011111951A_Machine_Translation.pdf".*
(Continued)

*Primary Examiner* — Carlos A Rivera
*Assistant Examiner* — Ruben Picon-Feliciano
(74) *Attorney, Agent, or Firm* — Oliff PLC (57) ABSTRACT

An EGR apparatus includes a EGR passage and an EGR valve provided in the EGR passage to regulate an EGR flow rate in the EGR passage. An ECU closes the EGR valve from an open state prior to start of deceleration of the engine based on engine rotation speed detected by a rotation speed sensor, accelerator opening degree detected by an accelerator sensor, and actual opening degree of the EGR valve. During deceleration of the engine, the ECU obtains a target opening degree of the EGR valve according to the separately detected engine rotation speed and accelerator opening degree from a target opening degree map and starts to close the EGR valve when a difference between an actual opening degree and the target opening degree of the EGR valve exceeds a predetermined value.

2 Claims, 9 Drawing Sheets (51) Int. Cl.
    *F02B 29/04*     (2006.01)
    *F02M 26/05*     (2016.01)
    *F02M 26/22*     (2016.01)
    *F02M 26/35*     (2016.01)
    *F02M 26/54*     (2016.01)

(52) U.S. Cl.
    CPC ............ *F02M 26/22* (2016.02); *F02M 26/35* (2016.02); *F02M 26/54* (2016.02); *Y02T 10/146* (2013.01)

(56) References Cited

U.S. PATENT DOCUMENTS

2010/0070122 A1\*   3/2010   Niimi .................... B60K 6/445
                                                                   701/22
2012/0024258 A1\*   2/2012   Hokuto ............... F02D 41/0057
                                                                   123/299

FOREIGN PATENT DOCUMENTS

| JP | 2001-082234 A | 3/2001 |
| JP | 2009-281261 A | 12/2009 |
| JP | A-2010-138734 | 6/2010 |
| JP | 2010-156323 A | 7/2010 |
| JP | A-2010-281303 | 12/2010 |
| JP | 2011111951 A \* | 6/2011 |
| JP | A-2011-111951 | 6/2011 |

OTHER PUBLICATIONS

Jun. 23, 2015 Office Action issued in Japanese Application No. 2012-118632.

\* cited by examiner

EXHAUST GAS RECIRCULATION APPARATUS FOR ENGINE

CROSS-REFERENCE TO RELATED APPLICATIONS

This application is based upon and claims the benefit of priority from the prior Japanese Patent Application No. 2012-118632 filed on May 24, 2012, the entire contents of which are incorporated herein by reference.

BACKGROUND OF THE INVENTION

Field of the Invention

The present invention relates to an exhaust gas recirculation apparatus for engine to allow a part of exhaust gas discharged from the engine to flow in an exhaust passage and recirculate back into the engine.

Related Art

The above type of technique is heretofore used in a vehicle engine, for example. An exhaust gas recirculation (EGR) apparatus is configured such that a part of exhaust gas discharged from a combustion chamber of an engine to an exhaust passage after combustion is introduced as EGR gas into an intake passage through an EGR passage, and then mixed with intake air flowing in the intake passage, and this mixture recirculates back into a combustion chamber. The EGR gas flowing in the EGR passage is regulated by an EGR valve provided in the EGR passage. This EGR can mainly reduce nitrogen oxide (NOx) in the exhaust gas and improve fuel consumption while the engine is subjected to partial load.

The exhaust gas from the engine contains no or little oxygen. Accordingly, when a part of exhaust gas is mixed with intake air by EGR, the concentration of oxygen in the intake air becomes lower. In the combustion chamber, therefore, a fuel burns in a low oxygen concentration state. This can decrease a peak temperature during combustion, thereby restraining the generation of NOx. In a gasoline engine, the EGR can prevent the oxygen content in the intake air from increasing and thus reduce a pumping loss of the engine even when a throttle valve is in to some extent closed state.

Herein, for further improvement of fuel consumption of an engine, it is recently conceived to perform EGR in every engine operating region. Thus, high EGR is demanded. To realize the high EGR, it is necessary to remodel a conventional apparatus by increasing an inner diameter of the EGR passage or increasing the size (diameter) of a valve element and the area of a flow path opening of a valve seat of an EGR valve.

Japanese patent application publication No. 2010-281303 (JP-A-2010-281303) discloses one example of a controller of an engine. This controller is provided with an EGR device and an intake pipe length switching mechanism. The EGR device includes an EGR passage and an EGR valve. The intake pipe length switching mechanism is provided in an intake passage and configured to selectively switch between a long passage and a short passage by means of a changeover valve. The EGR passage is connected to the intake passage at a position downstream of a throttle valve and upstream of the changeover valve. When an accelerator pedal of the engine is returned from a depressed state to a full-close position, the throttle valve is controlled to its closing side. At that time, when the EGR valve is closed from an open state, the changeover valve being in a long position to open the long passage is controlled to a short position to open the short passage. Alternatively, when the accelerator pedal is returned to the full-close position and thereby the throttle valve is closed, the EGR valve is controlled from the open state to a closing side and the changeover valve is controlled to the short position. This can improve EGR response property.

SUMMARY OF INVENTION

Problems to be Solved by the Invention

Meanwhile, it is conceivable that the EGR device disclosed in JP-A-2010-281303 is configured to enable high EGR. For this purpose, it can be considered that the passage diameter of the EGR passage is set larger and the valve element and the valve seat of the EGR valve are increased in size. Herein, during rapid engine deceleration, the EGR valve can be started to close based on a signal from an accelerator sensor that detects an opening degree of an accelerator pedal. However, since a closing speed of the EGR valve is structurally set to be slower than a closing speed of the throttle valve in even the above configuration, the EGR valve has a delay in closing and thus an excessive amount of exhaust gas flows in a combustion chamber. This may cause accidental fire of the engine during deceleration. Such a problem conceivably becomes significant if the EGR device is adapted to the high EGR.

For measures against the accidental fire of the engine during deceleration, it is therefore conceivable to control the opening start timing of the throttle valve to be delayed than the closing start timing of EGR valve when the accelerator pedal is returned from the depressed state to the full-close position. In this case, however, at an initial stage of deceleration of the engine, a driver does not receive deceleration reaction and hence may have a feeling of idle running of the engine.

The present invention has been made in view of the circumstances and has a purpose to provide an exhaust gas recirculation apparatus for engine, configured to improve a closing response property of an exhaust gas recirculation valve during engine deceleration, thereby preventing accidental fire of the engine during deceleration due to exhaust gas recirculation without imparting a feeling of idle running to a driver.

Means of Solving the Problems

To achieve the above purpose, one aspect of the invention provides an exhaust gas recirculation apparatus for engine, including: an exhaust gas recirculation passage to allow part of exhaust gas discharged from a combustion chamber of an engine to an exhaust passage to flow in an intake passage to recirculate back to the combustion chamber; and an exhaust gas recirculation valve provided in the exhaust gas recirculation passage to regulate a flow rate of exhaust gas in the exhaust gas recirculation passage, wherein the exhaust gas recirculation apparatus includes: an operation unit to operate operation of the engine; an operation amount detecting unit to detect an operation amount of the operation unit; and a control unit to control the exhaust gas recirculation valve according to an operating condition of the engine, and wherein based on at least a change in the operation amount of the operation unit detected by the operation amount detecting unit, the control unit causes the exhaust gas recirculation valve to close from an open state before deceleration of the engine is started.

Advantageous Effects of Invention

According to the present invention, it is possible to improve a closing response property of an exhaust gas recirculation valve at the time of deceleration of an engine, thereby preventing deceleration and misfire of the engine due to exhaust gas recirculation without imparting a feeling of idle running to a driver.

DESCRIPTION OF EMBODIMENTS

First Embodiment

A detailed description of a first embodiment of an exhaust gas recirculation apparatus for an engine embodying the present invention will now be given referring to the accompanying drawings.

Figure 1:
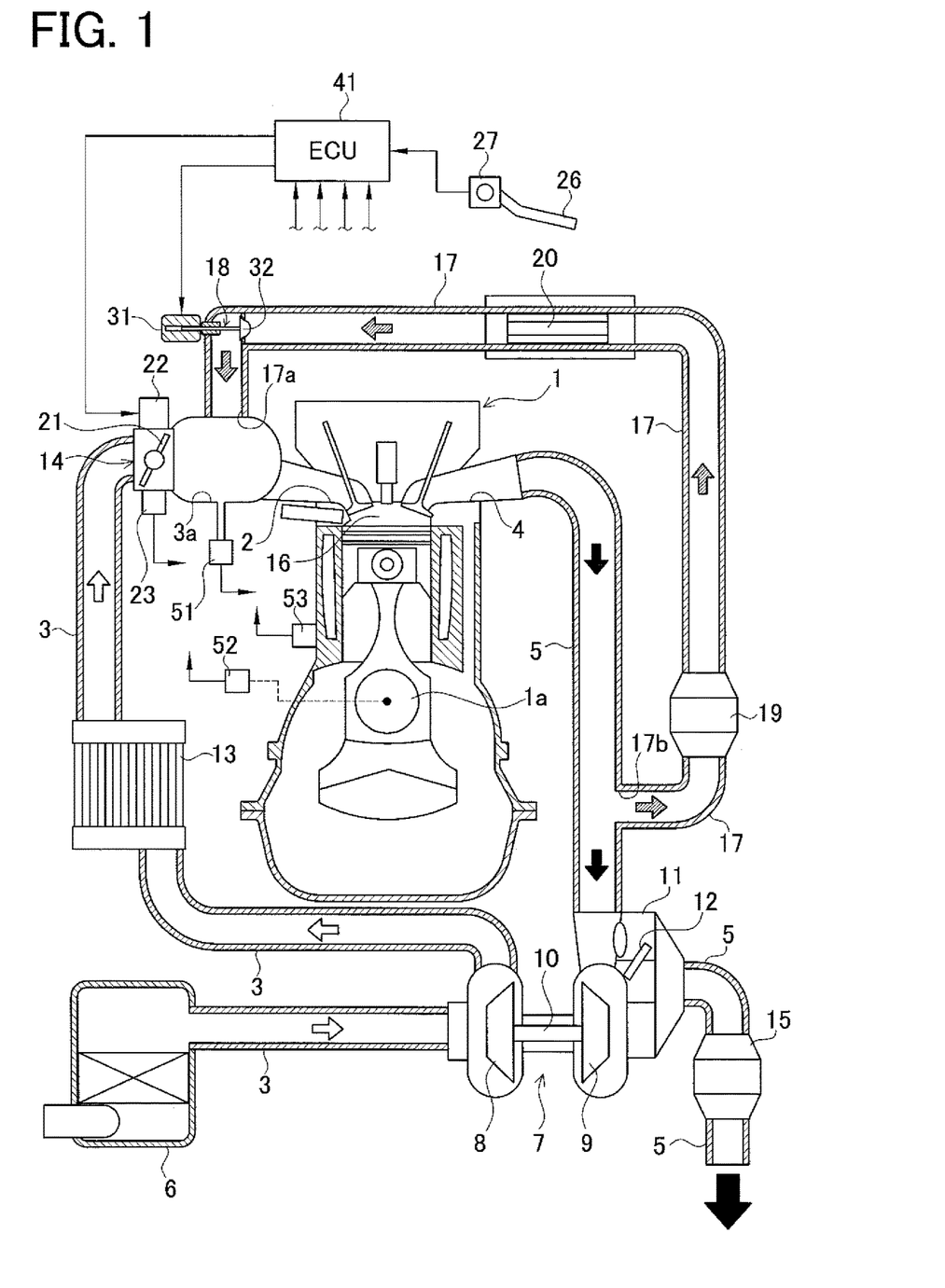
FIG. 1 is a schematic configuration view showing an engine system with a supercharger, the system including an exhaust gas recirculation (EGR) apparatus for engine in a first embodiment.

FIG. 1 is a schematic configuration view of an engine system with a supercharger, the system including an exhaust gas recirculation (EGR) apparatus for an engine in the present embodiment. This engine system includes a reciprocating-type engine 1. This engine 1 has an intake port 2 connected to an intake passage 3 and an exhaust port 4 connected to an exhaust passage 5. An air cleaner 6 is provided at an inlet of the intake passage 3. In the intake passage 3 downstream of the air cleaner 6, a supercharger 7 is placed in a position between a portion of the intake passage 3 and a portion of the exhaust passage 5 to raise the pressure of intake air in the intake passage 3.

The supercharger 7 includes a compressor 8 placed in the intake passage 3, a turbine 9 placed in the exhaust passage 5, and a rotary shaft 10 connecting the compressor 8 and the turbine 9 so that they are integrally rotatable. The supercharger 7 is configured to rotate the turbine 9 with exhaust gas flowing in the exhaust passage 5 and integrally rotate the compressor 8 through the rotary shaft 10 in order to increase the pressure of intake air in the intake passage 3, that is, carry out supercharging.

In the exhaust passage 5, adjacent to the supercharger 7, an exhaust bypass passage 11 is provided by detouring around the turbine 9. In this exhaust bypass passage 11, a waste gate valve 12 is placed. This waste gate valve 12 regulates exhaust gas allowed to flow in the exhaust bypass passage 11. Thus, a flow rate of exhaust gas to be supplied to the turbine 9 is regulated, thereby controlling the rotary speeds of the turbine 9 and the compressor 8, and adjusting supercharging pressure of the supercharger 7.

In the intake passage 3, an intercooler 13 is provided between the compressor 8 of the supercharger 7 and the engine 1. This intercooler 13 serves to cool intake air having the pressure raised by the compressor 8 and hence a high temperature, down to an appropriate temperature. A surge tank 3a is provided in the intake passage 3 between the intercooler 13 and the engine 1. Further, an electronic throttle device 14 which is a motor-operated throttle valve is placed downstream of the intercooler 13 but upstream of the surge tank 3a. This electronic throttle device 14 includes a butterfly-shaped throttle valve 21 placed in the intake passage 3, a step motor 22 to drive the throttle valve 21 to open and close, and a throttle sensor 23 to detect an opening degree (a throttle opening degree) TA of the throttle valve 21. The electronic throttle device 14 is configured so that the throttle valve 21 is driven to open and close, thereby adjusting its opening degree, by the step motor 22 in response to operation of an accelerator pedal 26 by a driver. Available as the structure of the electronic throttle device 14 is, for example, a basic structure of a "throttle device" disclosed in FIGS. 1 and 2 of Japanese patent application publication No. 2011-252482. In the exhaust passage 5 downstream of the turbine 9, a catalytic converter 15 is provided as an exhaust catalyst to clean exhaust gas.

In the present embodiment, the EGR apparatus to achieve high EGR includes an exhaust gas recirculation passage (an EGR passage) 17 allowing a part of exhaust gas discharged from a combustion chamber 16 of the engine 1 to the exhaust passage 5 to flow in the intake passage 3 and recirculate back to the combustion chamber 16, and an exhaust gas recirculation valve (an EGR valve) 18 in the EGR passage 17 to regulate an exhaust flow rate (an EGR flow rate) in the EGR passage 17. The EGR passage 17 is provided to extend between the exhaust passage 5 upstream of the turbine 9 and the surge tank 3a. Specifically, an outlet 17a of the EGR passage 17 is connected to the surge tank 3a on a downstream side of the throttle valve 14 in order to allow a part of exhaust gas flowing in the exhaust passage 5 to flow as EGR gas into the intake passage 3 and return to the combustion chamber 16. An inlet 17b of the EGR passage 17 is connected to the exhaust passage 5 upstream of the turbine 9.

In the EGR passage 17, near the inlet 17b, an EGR catalytic converter 19 is provided to clean EGR gas. In the EGR passage 17 downstream of this EGR catalytic converter 19, an EGR cooler 20 is provided to cool EGR gas flowing in the EGR passage 17. In the present embodiment, the EGR valve 18 is located in the EGR passage 17 downstream of the EGR cooler 20.

Figure 2:
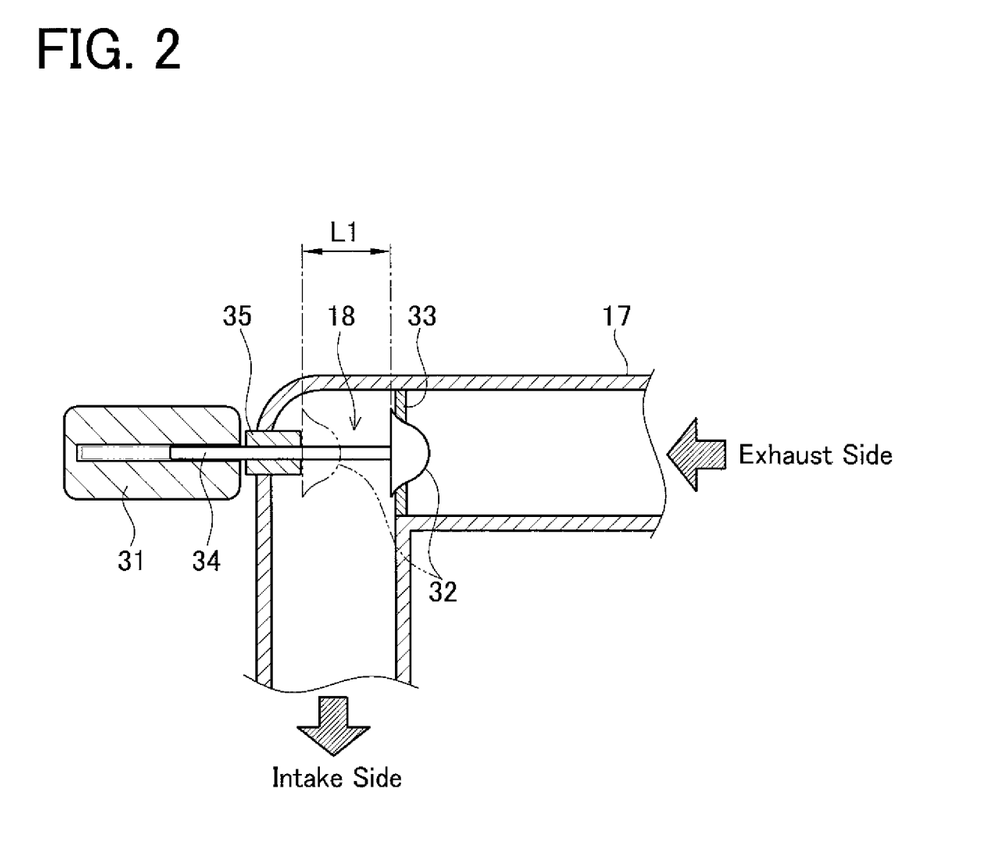
FIG. 2 is an enlarged cross sectional view showing a part of an EGR passage in which an EGR valve is provided in the first embodiment.

FIG. 2 is an enlarged cross sectional view of a part of the EGR passage 17, in which the EGR valve 18 is provided. As shown in FIGS. 1 and 2, the EGR valve 18 is configured as a poppet valve and a motor-operated valve. To be concrete, the EGR valve 18 is provided with a valve element 32 to be driven by a step motor 31. The valve element 32 has an almost conical shape and is configured to seat on a valve seat 33 provided in the EGR passage 17. The step motor 31 includes an output shaft 34 arranged to reciprocate in a straight line (stroke movement). The valve element 32 is fixed at a leading end of the output shaft 34. This output shaft 34 is supported in a housing defining the EGR passage 17 through a bearing 35. The stroke movement of the output shaft 34 of the step motor 31 is performed to adjust the opening degree of the valve element 32 with respect to the valve seat 33. The output shaft 34 of the EGR valve 18 is provided to allow stroke movement by a predetermined stroke L1 between a fully closed position in which the valve element 32 seats on the valve seat 33 and a fully opened position in which the valve element 32 contacts with the bearing 35. In the present embodiment, an opening area of the valve seat 33 is set larger than a conventional one in order to achieve high EGR. Accordingly, the valve element 32 is also designed with large size. Available as the structure of the above EGR valve 18 is, for example, a basic structure of an "EGR valve" disclosed in FIG. 1 of Japanese patent application publication No. 2010-275941. In the present embodiment, the valve closing speed of the EGR valve 18 is set to be structurally slower than the valve closing speed of the electronic throttle device 14.

In the present embodiment, for separately controlling the electronic throttle device 14 and the EGR valve 18 according to the operating condition of the engine 1, the step motor 22 of the electronic throttle device 14 and the step motor 31 of the EGR valve 18 are each controlled by an electronic control unit (ECU) 41. This ECU 41 includes a central processing unit (CPU), various memories for storing predetermined control programs and others in advance or temporarily storing calculation results of the CPU, and an external input circuit and an external output circuit each connected to the above sections. The ECU 41 corresponds to one example of a control unit of the present invention. Each of the step motors 22 and 31 is connected to the external output circuit. Various sensors 27 and 51-53 corresponding to one example of an operating condition detecting unit for detecting the operating condition of the engine 1 are connected to the external input circuit to which various engine signals are input from the sensors. Further, the ECU 41 outputs a predetermined command signal to the step motor 31 in order to control the step motor 31. The ECU 14 is configured to detect an actual opening degree TTegr (related to a stroke position of the output shaft 34) of the valve element 32 of the EGR valve 18 based on the command signal to the step motor 31. The ECU 14 corresponds to one example of an actual opening degree detecting unit of the present invention.

Herein, as various sensors, there are provided the throttle sensor 23 and further an accelerator sensor 27, an intake pressure sensor 51, a rotation speed sensor 52, and a water temperature sensor 53. The accelerator sensor 27 detects an accelerator opening degree ACC which is an operation amount of the accelerator pedal 26 and corresponds to one example of an operation amount detecting unit of the present invention. The accelerator pedal 26 corresponds to one example of an operation unit of the present invention to control the operation of the engine 1. The intake pressure sensor 51 detects intake pressure PM in the surge tank 3a. The rotation speed sensor 52 detects, as engine rotation speed NE, a rotation angle (crank angle) of a crank shaft 1a of the engine 1 and corresponds to one example of a rotation speed detecting unit of the present invention. The water temperature sensor 53 detects cooling-water temperature THW of the engine 1. In the present embodiment, the intake pressure sensor 51 and the rotation speed sensor 52 correspond to one example of a load detecting unit of the invention.

Figure 3:
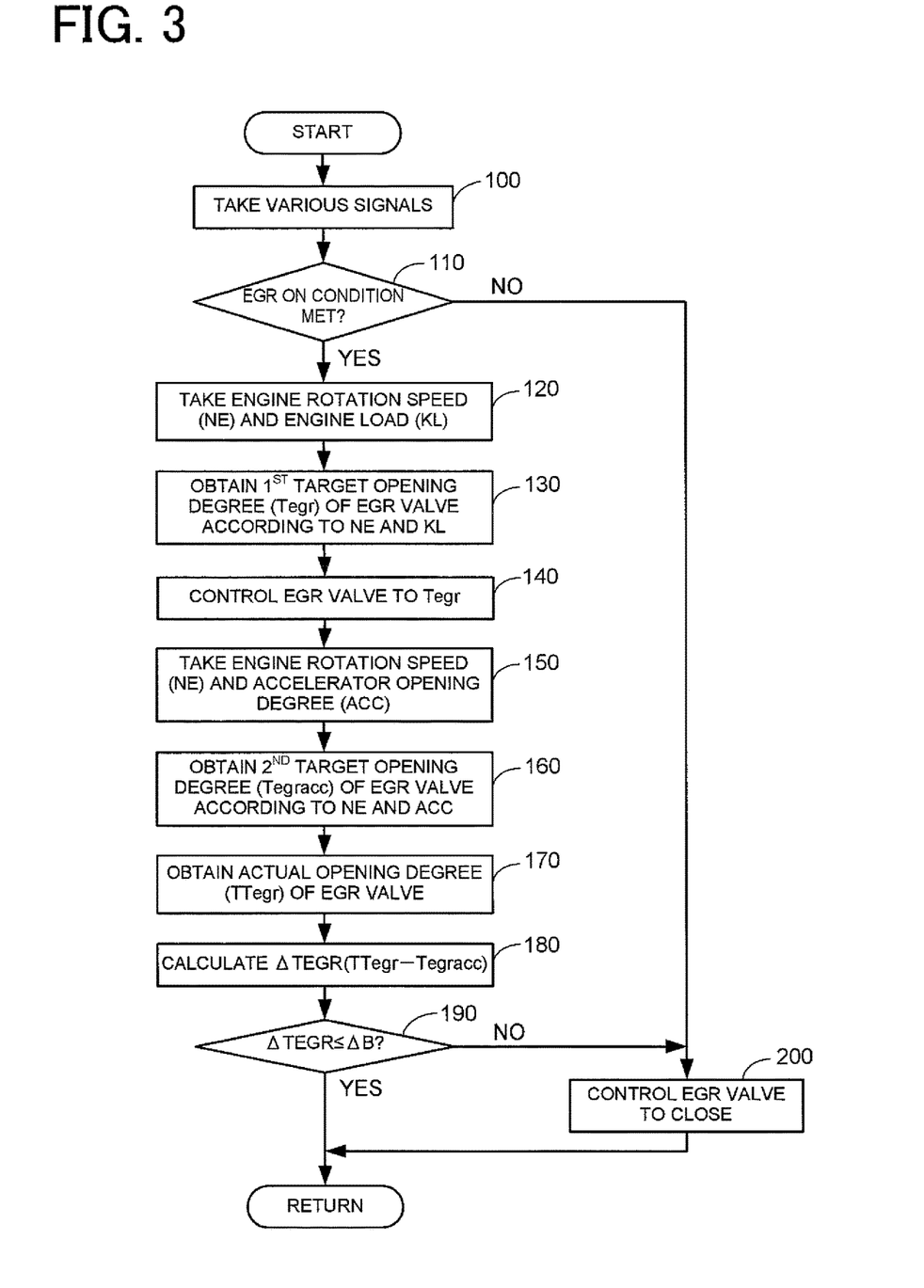
FIG. 3 is a flowchart showing one example of processing details of EGR control in the first embodiment.

The processing details of EGR control of the EGR apparatus configured as above to be executed by the ECU 41 will be explained below. FIG. 3 is a flowchart showing one example of the processing details of the EGR control.

When the processing shifts to this routine, the ECU 41 first takes or reads various signals indicating the operating condition of the engine 1 in step 100.

In step 110, the ECU 41 then determines whether or not an EGR ON condition is met. That is, it is judged whether or not the operating condition of the engine 1 is in a state in which EGR is to be performed. The ECU 41 makes this determination based on the read various signals. If a negative result (NO) is obtained in this step 110, the ECU 41 does not perform the EGR and shifts the processing to step 200.

In step 200, the ECU 41 controls the step motor 31 to close the EGR valve 18. Specifically, the valve element 32 of the EGR valve 18 is fully closed, shutting off EGR (EGR cut).

On the other hand, if an affirmative result (YES) is obtained in step 110, the ECU 41 shifts the processing to step 120 to perform EGR. In step 120, the ECU 41 takes the engine rotation speed NE and the engine load KL. Herein, the engine load KL can be determined from for example a relationship between the engine rotation speed NE and the intake pressure PM. This engine load KL is calculated by the ECU 41.

Figure 4:
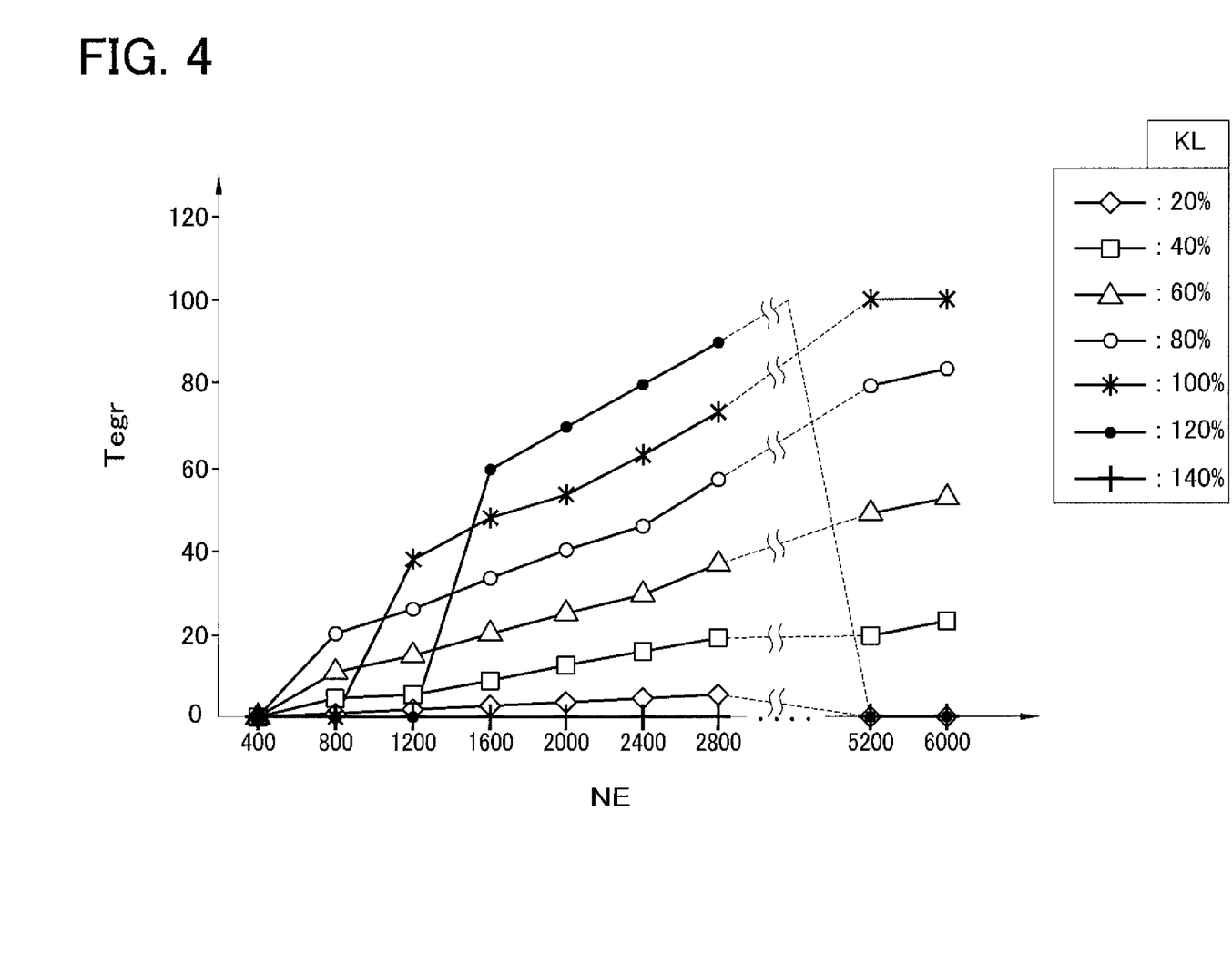
FIG. 4 is a first target opening degree map showing a relationship between engine rotation speed and engine load and a first target opening degree in the first embodiment.

In step 130, successively, the ECU 41 obtains a first target opening degree Tegr of the EGR valve 18 according to the engine rotation speed NE and the engine load KL. The ECU 41 performs this processing by referring to a first target opening degree map which is previously set function data. FIG. 4 illustrates one example of the first target opening degree map showing a relationship between the engine rotation speed NE and the engine load KL and the first target opening degree Tegr. As shown in FIG. 4, the first target opening degree map is schematically set so that the value of the first target opening degree Tegr becomes gradually larger as the engine rotation speed NE becomes higher toward an upper limit under the condition that the engine load KL is constant, excepting a high load case (120% and 140%). Furthermore, the first target opening degree map is set so that the value of the first target opening degree Tegr becomes gradually larger as the engine load KL increases toward an upper limit under the condition that the engine rotation speed NE is constant.

In step 140, the ECU 41 controls the step motor 31 to open the EGR valve 18 to the first target opening degree Tegr.

In step 150, the ECU 41 takes the engine rotation speed NE and the accelerator opening degree ACC.

Figure 5:
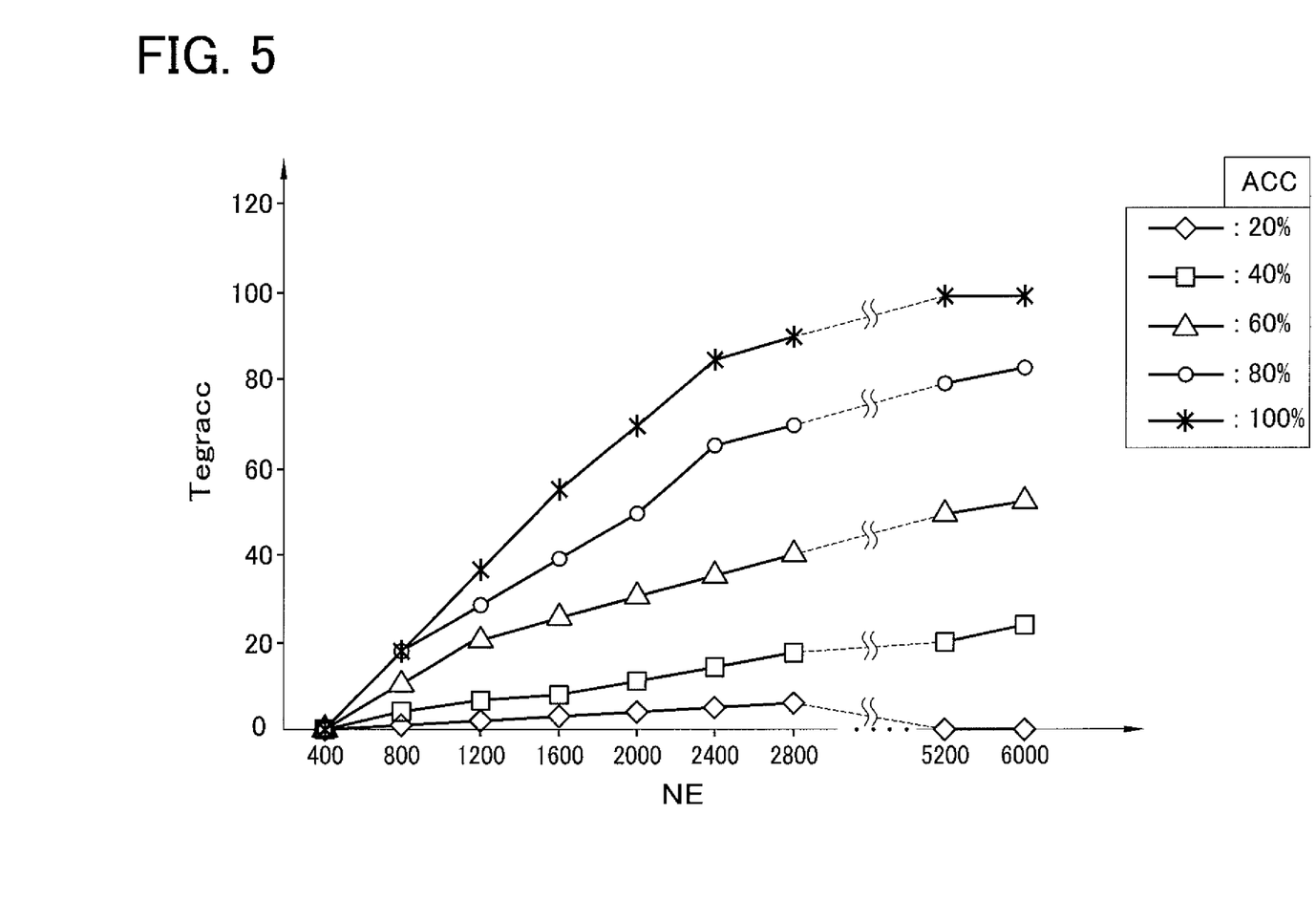
FIG. 5 is a second target opening degree map showing a relationship between engine rotation speed and accelerator opening degree and a second target opening degree in the first embodiment.

In step 160, the ECU 41 obtains a second target opening degree Tegracc of the EGR valve 18 according to the engine rotation speed NE and the accelerator opening degree ACC. The ECU 41 makes this processing by referring to a second target opening degree map which is previously set function data. FIG. 5 illustrates one example of the second target opening degree map showing a relationship between the engine rotation speed NE and the accelerator opening degree ACC and the second target opening degree Tegracc. As shown in FIG. 5, the second target opening degree map is schematically set so that the value of the second target opening degree Tegracc becomes gradually larger as the engine rotation speed NE becomes higher toward an upper limit under the condition that the accelerator opening degree ACC is constant, excepting a case where the accelerator opening degree ACC is a high opening degree (100%). Furthermore, the second target opening degree map is set so that the value of the second target opening degree Tegracc becomes gradually larger as the accelerator opening degree ACC increases toward an upper limit under the condition that the engine rotation speed NE is constant.

In step 170, the ECU 41 then obtains an actual opening degree TTegr of the valve element 32 of the EGR valve 18 based on the command signal to the step motor 31.

In step 180, the ECU 41 calculates an opening degree deviation ΔTEGR corresponding to a difference between the actual opening degree TTegr and the second target opening degree Tegracc.

In step 190, the ECU 41 determines whether or not the opening degree deviation ΔTEGR is equal to or lower than a predetermined value ΔB. Specifically, it is judged whether or not an operation delay of the EGR valve 18 falls within a permissible range. Herein, there is an operation delay of "32 ms" for example from when a signal representing the accelerator opening degree ACC is input to the ECU 41 to when the ECU 41 starts control of the electronic throttle device 14 based on the input signal. As one example, therefore, the above predetermined value ΔB is set to a value so that the time until the ECU 41 starts control of the EGR valve 18 based on the signal representing the accelerator opening degree ACC is shorter than the operation delay time (e.g., 32 ms) of the electronic throttle device 14. If NO in this step 190, the ECU 41 executes the processing of step 200 to shut off EGR. If YES in step 190, the ECU 41 returns the processing to step 100.

According to the above EGR control, the ECU 41 controls the EGR valve 18 according to the operating condition of the engine 1. Based on the engine rotation speed NE, accelerator opening degree ACC, and actual opening degree TTegr of the EGR valve 18, the ECU 41 further causes the EGR valve 18 to close from the open state prior to start of deceleration of the engine. In particular, at the time of deceleration of the engine 1 in which the electronic throttle device 14 is fully closed, the ECU 41 obtains the second target opening degree Tegracc of the EGR valve 18 according to the engine rotation speed NE and accelerator opening degree ACC from the second target opening degree map. The ECU 41 then starts to close the EGR valve 18 at the time when the opening degree deviation ΔTEGR between the actual opening degree TTegr of the EGR valve 18 and the obtained second target opening degree Tegracc is larger than the predetermined value ΔB.

According to the EGR apparatus in the present embodiment explained above, while the EGR valve 18 is open during operation of the engine 1 and non-operation of the supercharger 7, the negative pressure generated in the surge tank 3a downstream of the electronic throttle device 14 acts on the exit 17a of the EGR passage 17, thereby sucking part of the exhaust gas flowing in the exhaust passage 5 into the surge tank 3a through the EGR catalytic converter 19, EGR passage 17, and the EGR cooler 20. Therefore, during non-operation of the supercharger 7, an appropriate amount of EGR gas is allowed to flow in the intake passage 3 through the EGR passage 17 and recirculate into the combustion chamber 16. At that time, the EGR flow rate in the EGR passage 17 can be arbitrarily adjusted by appropriate control of the opening degree of the EGR valve 18.

On the other hand, while the EGR valve 18 is open during operation of the engine 1 and operation of the supercharger 7, supercharged exhaust pressure in the exhaust passage 5 acts on the inlet 17b of the EGR passage 17, thereby forcing part of the exhaust gas flowing in the exhaust passage 5 to flow, as EGR gas, into the surge tank 3a through the EGR catalytic convertor 19, EGR passage 17, and EGR cooler 20. Thus, during operation of the supercharger 7, an appropriate amount of EGR gas is allowed to flow in the intake passage through the EGR passage 17 and recirculate to the combustion chamber 16. At that time, an EGR flow rate in the EGR passage 17 can be adjusted arbitrarily by appropriate control of the opening degree of the EGR valve 18.

According to the present embodiment, the EGR valve 18 is configured as the poppet valve, so that the characteristics of the EGR flow rate determined by opening and closing of the EGR valve 18 gradually change with respect to the opening degree of the EGR valve 18. Further, the EGR valve 18 is configured as the motor-operated valve to be driven by the step motor 31, so that the opening degree of the EGR valve 18 is consecutively variable. Thus, by controlling the opening degree of the EGR valve 18, a high EGR flow rate in the EGR passage 17 can be gradually changed and adjusted. In every operating region of the engine 1, consequently, it is possible to reduce mainly nitrogen oxide (NOx) in the exhaust gas in the engine 1 and prevent deterioration in exhaust emission and improve fuel consumption of the engine 1.

According to the present embodiment, based on the engine rotation speed NE detected by the rotation speed sensor 52, the accelerator opening degree ACC detected by the accelerator sensor 27, and the actual opening degree TTegr of the EGR valve 18 detected by the ECU 41, the ECU 41 closes the EGR valve 18 from the open state prior to start of deceleration of the engine 1 in which the electronic throttle device 14 is fully closed. Accordingly, in response to operation of the accelerator pedal 26 from the depressed state to the full-close position, the EGR valve 18 is closed from the open state before the deceleration of the engine 1 is started, that is, faster than the electronic throttle device 14 is returned to full close. During deceleration of the engine 1, therefore, a flow of EGR gas in the EGR passage 17 is shut off early, and recirculation of EGR gas to the combustion chamber 16 is restrained. As a result of this, the EGR valve 18 can have an improved response property for valve closing at the time of deceleration of the engine 1 and thus deceleration and misfire of the engine 1 due to EGR can be prevented. In the present embodiment, furthermore, at the time of deceleration of the engine 1, the closing operation of the electronic throttle device 14 is not delayed. Thus, any feeling of idle running is not imparted to a driver at an early stage of deceleration of the engine 1.

In the present embodiment, at the time of deceleration of the engine 1, the second target opening degree Tegracc of the EGR valve 18 according to the engine rotation speed NE and the accelerator opening degree ACC which are separately detected is determined by the ECU 41 referring to the second target opening degree map. When the opening degree deviation ΔTEGR between the actually detected opening degree TTegr of the EGR valve 18 and the determined second target opening degree Tegracc of the EGR valve 18 is larger than the predetermined value ΔB, the ECU 41 starts closing of the EGR valve 18. Herein, at the time of deceleration of the engine 1, the opening degree deviation ΔTEGR between the actual opening degree TTegr and the second target opening degree Tegracc of the EGR valve 18 means the degree of closing delay of the EGR valve 18. Accordingly, the degree of closing delay of the EGR valve 18 is compared with the predetermined value ΔB and thus the closing operation of the EGR valve 18 is started in anticipation of the valve closing delay before start of deceleration of the engine 1. Accordingly, at the time of deceleration of the engine 1, the closing response property of the EGR valve 18 can be precisely advanced irrespective of individual differences in operation and changes over time of the EGR valve 18.

Figure 6:
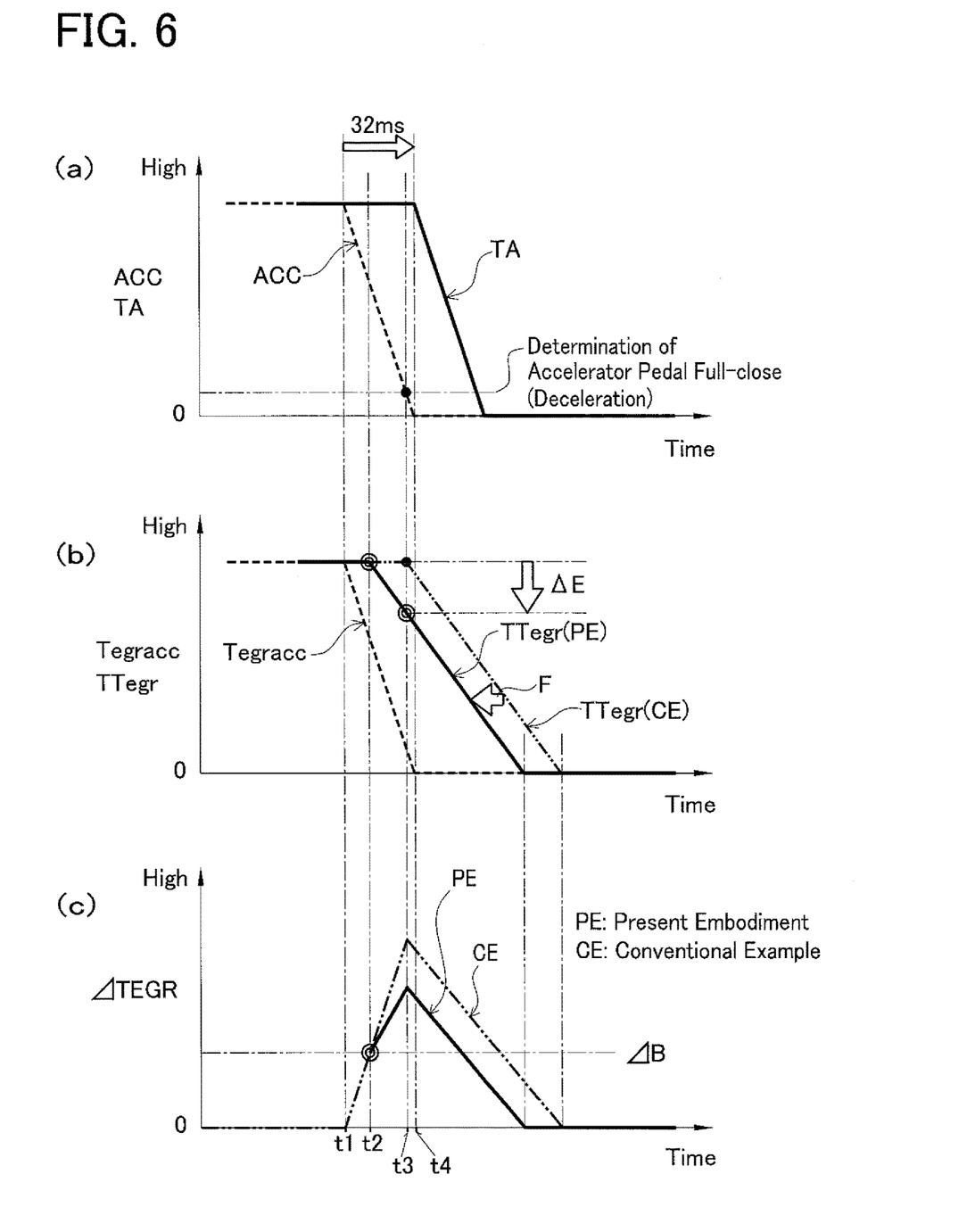
FIG. 6 is a time chart showing behaviors of accelerator opening degree, throttle opening degree, second target opening degree, actual opening degree, and opening degree deviation in the first embodiment.

FIG. 6 is time charts showing behaviors of the accelerator opening degree ACC, throttle opening degree TA, second target opening degree Tegracc, actual opening degree TTegr, and opening degree deviation ΔTEGR. In FIG. 6, at time t1, when the accelerator pedal 26 is released from depression, the accelerator opening degree ACC starts to lower from a predetermined value toward full close. In the present embodiment, there is an operation delay of "32 ms" from when the accelerator pedal 26 is released from depression to when the throttle valve 21 of the electronic throttle device 14 starts to close from an open state and the throttle opening degree TA starts to lower toward full close. At time t2, thereafter, when the deviation ΔTEGR between the actual opening degree TTegr and the second target opening degree Tegracc exceeds the predetermined value ΔB, the EGR valve 18 starts to close from the open state. At time t3, full close (deceleration) of the accelerator pedal 26 is determined. At that time, however, the EGR valve 18 has been closed to some extent. At time t4, the electronic throttle device 14 is controlled and the throttle opening degree TA starts to decrease toward full close. In a conventional example, at time t3, full close of the accelerator pedal 26 is determined and, as shown in FIG. 6 (*b*), the EGR valve 18 would be started to close from an open state. In contrast, in the present embodiment, the EGR valve 18 is started to close at time t2 when the opening degree deviation ΔTEGR exceeds the predetermined value ΔB. It is therefore seen in FIG. 6 (*b*) that, at time t3, an opening degree reduction effect ΔE of the actual opening degree TTegr is attained. Furthermore, it is also shown in FIG. 6 (*b*) that a change in actual opening degree TTegr in the present embodiment is advanced in terms of time as indicated by an arrow F as compared with a change in conventional actual opening degree TTegr.

Second Embodiment

A second embodiment embodying the exhaust gas recirculation apparatus for an engine according to the present invention will be explained in detail with reference to accompanying drawings.

Similar or identical components in each of the following embodiments to those in the first embodiment are given the same reference signs as those in the first embodiment and their details are omitted. The following explanation is made with a focus on differences from the first embodiment.

Figure 7:
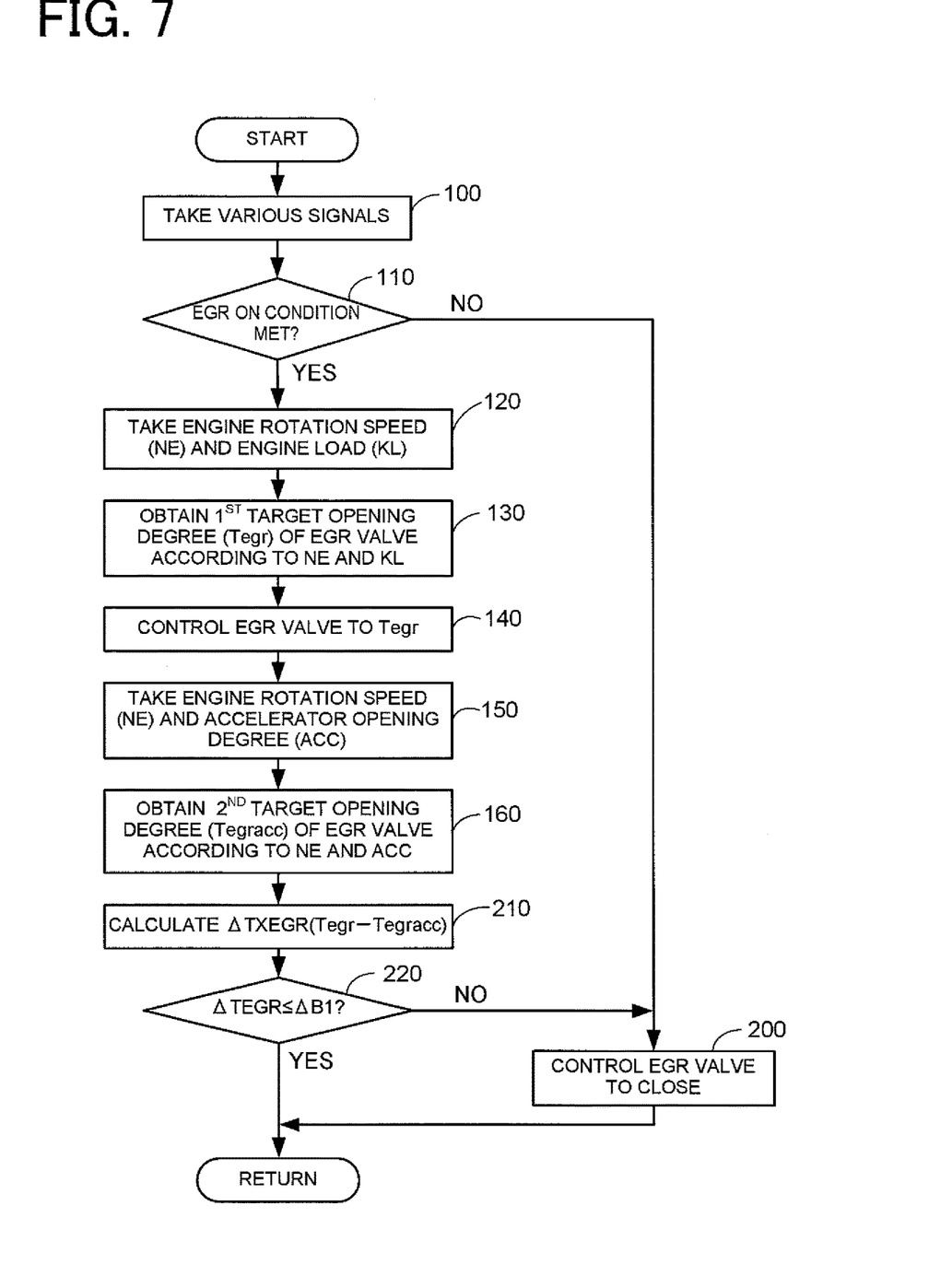
FIG. 7 is a flowchart showing one example of processing details of EGR control in a second embodiment.

This second embodiment differs from the first embodiment in processing details of EGR control. FIG. 7 is a flowchart showing one example of the processing details of EGR control.

The processing details in steps 210 and 220 in the flowchart shown in FIG. 7 are different from those in steps 170 to 190 in the flowchart shown in FIG. 3. The other processing details in steps 100 to 160 and 200 in FIG. 7 are the same as those in the flowchart in FIG. 3.

As shown in FIG. 7, in step 210 following step 160, the ECU 41 calculates an opening degree deviation ΔTXEGR corresponding to a difference between the first target opening degree Tegr and the second target opening degree Tegracc.

In step 220, the ECU 41 determines whether or not the opening degree deviation ΔTXEGR is equal to or lower than a predetermined value ΔB1, that is, whether or not an operation delay of the EGR valve 18 falls within a permissible range. Herein, there is an operation delay of for example "32 ms" from when a signal representing the accelerator opening degree ACC is input to the ECU 41 to when the ECU 41 starts control of the electronic throttle device 14 based on the input signal. As one example, accordingly, the above predetermined value ΔB1 is set to a value so that the time until the ECU 41 starts control of the EGR valve 18 based on the signal representing the accelerator opening degree ACC is shorter than the operation delay time (e.g., 32 ms) of the electronic throttle device 14. If NO in this step 220, the ECU 41 executes the processing of step 200 to shut off EGR. If YES in step 220, the ECU 41 returns the processing to step 100.

According to the above EGR control, the ECU 41 controls the EGR valve 18 according to the operating condition of the engine 1. Based on the engine rotation speed NE, engine load KL, and accelerator opening degree ACC, the ECU 41 further causes the EGR valve 18 to close from the open state prior to start of deceleration of the engine 1. To be specific, at the time of deceleration of the engine 1 in which the electronic throttle device 14 is fully closed, the ECU 41 obtains the first target opening degree Tegr according to the engine rotation speed NE and engine load KL from the first target opening degree map and also obtains the second target opening degree Tegracc according to the engine rotation speed NE and accelerator opening degree ACC from the second target opening degree map. The ECU 41 then starts to close the EGR valve 18 when the opening degree deviation ΔTXEGR between the obtained first target opening degree Tegr and the obtained second target opening degree Tegracc is larger than the predetermined value ΔB1.

According to the present embodiment, based on the engine rotation speed NE detected by the rotation speed sensor 52, the engine load KL detected by the intake pressure sensor 51 and the rotation speed sensor 52, and the accelerator opening degree ACC detected by the accelerator sensor 27, the ECU 41 closes the EGR valve 18 from the open state prior to start of deceleration of the engine 1 in which the electronic throttle device 14 is fully closed. Accordingly, in response to operation of the accelerator pedal 26 to return from the depressed state to the full close position, the EGR valve 18 is closed from the open state before the deceleration of the engine 1 is started, that is, faster than the electronic throttle device 14 is returned to full close. During deceleration of the engine 1, therefore, a flow of EGR gas in the EGR passage 17 is shut off, thereby restraining recirculation of EGR gas to the combustion chamber 16. As a result of this, the valve closing response property of the EGR valve 18 at the time of deceleration of the engine 1 can be improved and accordingly the deceleration and misfire of the engine 1 due to EGR can be prevented. In the present embodiment, moreover, it is not necessary to delay the valve closing operation of the electronic throttle device 14 at the time of deceleration of the engine 1. Thus, a feeling of idle running is not imparted to a driver at an early stage of deceleration of the engine 1.

In the present embodiment, at the time of deceleration of the engine 1, the first target opening degree Tegr of the EGR valve 18 according to the engine rotation speed NE and the engine load KL separately detected is obtained by the ECU 41 by referring to the first target opening degree map. The second target opening degree Tegracc of the EGR valve 18 according to the engine rotation speed NE and the accelerator opening degree ACC separately detected is obtained by the ECU 41 by referring to the second target opening degree map. Furthermore, when the opening degree deviation ΔTXEGR between the first target opening degree Tegr and the second target opening degree Tegracc separately obtained exceeds the predetermined value ΔB1, the EGR valve 18 is started to close under control of the ECU 41. Herein, at the time of deceleration of the engine 1, the opening degree deviation ΔTXEGR between the first target opening degree Tegr and the second target opening degree Tegracc of the EGR valve 18 means the degree of valve closing delay of the EGR valve 18. Accordingly, by comparing the degree of valve closing delay of the EGR valve 18 with the predetermined value ΔB1, the EGR valve 18 is started to close in anticipation of the valve closing delay before deceleration of the engine 1 is started. Thus, at the time of deceleration of the engine 1, the valve closing response property of the EGR valve 18 can be advanced in response to returning operation of the accelerator pedal 26. Other operations and effects in the present embodiment are the same as those in the first embodiment.

Third Embodiment

A third embodiment embodying the exhaust gas recirculation apparatus for engine according to the present invention will be explained in detail with reference to accompanying drawings.

Figure 8:
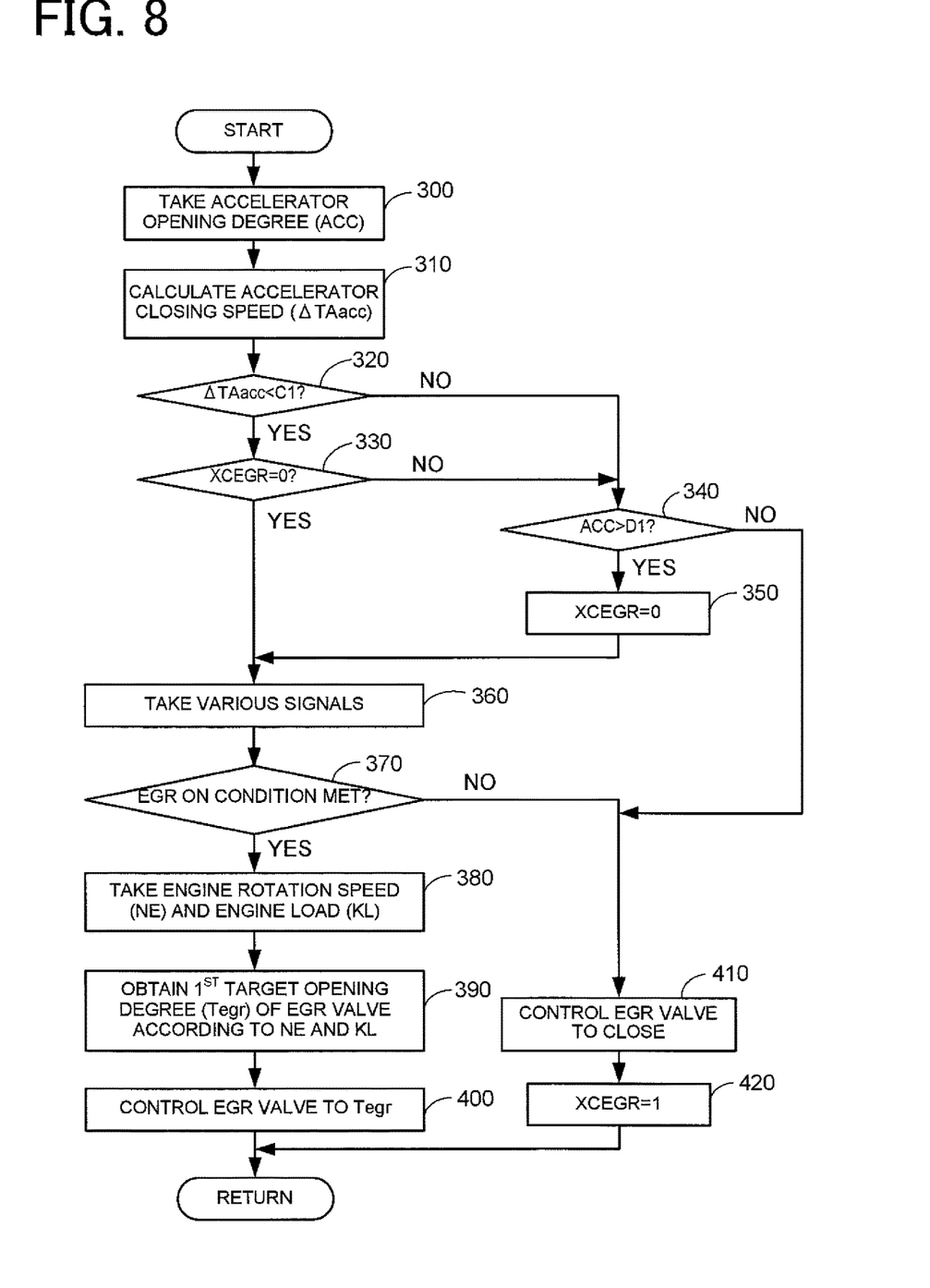
FIG. 8 is a flowchart showing one example of processing details of EGR control in a third embodiment.

This third embodiment differs from the first embodiment in processing details of EGR control. FIG. 8 is a flowchart showing one example of the processing details of EGR control.

When the processing shifts to this routine, in step 300, the ECU 41 first takes an accelerator opening degree ACC.

In step 310, the ECU 41 obtains an accelerator closing speed ΔTAacc which is a decreasing rate or speed of the accelerator opening degree ACC. The ECU 41 calculates the accelerator closing speed ΔTAacc from a difference between a value of a currently taken accelerator opening degree ACC and a previously taken accelerator opening degree ACC.

In step 320, the ECU 41 determines whether or not the accelerator closing speed ΔTAacc is smaller than a predetermined value C1. If NO in this step 320, the ECU 41 determines the accelerator opening degree ACC to be rapidly decreasing (a rapid decrease mode) and thus shifts the processing to step 340. If YES in the step 320, the ECU 41 determines the accelerator opening degree ACC to be slowly decreasing (a slow decrease mode) and shifts the processing to step 330.

In step 330, the ECU 41 then determines whether or not a valve closing flag XCEGR of the EGR valve 18 is "0". Herein, the valve closing flag XCEGR is set to "1" when the EGR valve 18 is closed and to "0" when the EGR valve 18 is opened. Then, the ECU 41 shifts the processing to step 340 if NO in step 330, while the ECU 41 shifts the processing to step 360 if YES in step 330.

In step 340 following step 320 or 330, the ECU 41 determines whether or not the accelerator opening degree ACC is larger than a predetermined value D1. If YES in step 340, the ECU 41 determines the accelerator opening degree ACC to be a large opening degree and sets the valve closing flag XCEGR to "0" in step 350 and then shifts the processing to step 360. If NO in step 340, the ECU 41 determines the accelerator opening degree ACC to be a small opening degree and shifts the processing to step 410.

In step 410, the ECU 41 controls the step motor 31 to close the EGR valve 18. Specifically, the valve element 32 of the EGR valve 18 is closed from the open state to fully close. In step 420, thereafter, the ECU 51 sets the valve closing flag XCEGR of the EGR valve 18 to "1".

On the other hand, in step 360 following step 330 or 350, the ECU 41 takes or reads various signals representing the operating condition of the engine 1.

In step 370, the ECU 41 successively determines whether or not an EGR ON condition is met, that is, whether or not the operating state of the engine 1 is in a state in which EGR is to be performed. If NO in step 370, not to perform EGR, the ECU 41 executes the processing in step 410 and 420.

On the other hand, if YES in step 370, to perform EGR, the ECU 41 shifts the processing to step 380. In step 380, the ECU 41 takes an engine rotation speed NE and an engine load KL.

In step 390, successively, the ECU 41 obtains a first target opening degree Tegr of the EGR valve 18 according to the engine rotation speed NE and the engine load KL. The ECU 41 makes this processing by referring to a first target opening degree map (e.g., a map shown in FIG. 4) which is previously set function data.

In step 400, the ECU 41 controls the step motor 31 to control the EGR valve 18 to the first target opening degree Tegr.

According to the above EGR control, the ECU 41 controls the EGR valve 18 according to the operating condition of the engine 1. The ECU 41 also calculates a decreasing rate of the detected accelerator opening degree ACC as the accelerator closing speed ΔTAacc and, based on the accelerator closing speed ΔTAacc and the accelerator opening degree ACC, closes the EGR valve 18 from the open state prior to start of deceleration of the engine 1. To be concrete, at the time of deceleration of the engine 1 in which the electronic throttle device 14 is fully closed, the ECU 41 starts to close the EGR valve 18 when the detected accelerator opening degree ACC is a small operation amount that is smaller than the predetermined value D1 and the calculated accelerator closing speed ΔTAacc is larger than the predetermined value C1, corresponding to a rapid decrease in the accelerator opening degree (rapid decrease mode).

According to the EGR apparatus in the present embodiment explained above, the accelerator closing speed ΔTAacc which is a decreasing rate of the accelerator opening degree ACC detected by the accelerator sensor 27 is calculated by the ECU 41. Based on the calculated accelerator closing speed ΔTAacc and the detected accelerator opening degree ACC, the ECU 41 closes the EGR valve 18 from the open state prior to start of deceleration of the engine 1. Accordingly, in response to returning operation of the accelerator pedal 26 from the depressed state to the fully closed position, the EGR valve 18 is closed from the open state before start of deceleration of the engine 1, that is, faster than the electronic throttle device 14 is returned to full close. During deceleration of the engine 1, therefore, a flow of EGR gas in the EGR passage 17 is shut off, thereby restraining recirculation of EGR gas to the combustion chamber 16. As a result of this, the valve closing response property of the EGR valve 18 at the time of deceleration of the engine 1 can be improved and thus the deceleration and misfire of the engine 1 due to EGR can be prevented. In the present embodiment, furthermore, the valve closing operation of the electronic throttle device 14 is not delayed at the time of deceleration of the engine 1. Thus, a feeling of idle running is not imparted to a driver at an early stage of deceleration of the engine 1.

According to the present embodiment, at the time of deceleration of the engine 1, when the detected accelerator opening degree ACC is a small opening degree smaller than the predetermined value D1 and the calculated accelerator closing speed ΔTAcc is rapid decrease larger than the predetermined value C1, the ECU 41 starts to close the EGR valve 18. Herein, the time when the accelerator opening degree ACC is small opening degree and the accelerator closing speed ΔTAacc is rapid decrease represents that the accelerator pedal 26 is returned from the depressed state to the fully closed position to decelerate the engine 1. Accordingly, since the deceleration of the engine 1 is determined early based on the above conditions, the EGR valve 18 is started to close before deceleration of the engine 1 is started. During deceleration of the engine 1, therefore, this can advance the valve closing response property of the EGR valve 18 in response to returning operation of the accelerator pedal 26. Other operations and effects in the present embodiment are the same as those in the first embodiment.

Fourth Embodiment

A fourth embodiment embodying the exhaust gas recirculation apparatus for engine according to the present invention will be explained in detail with reference to accompanying drawings.

Figure 9:
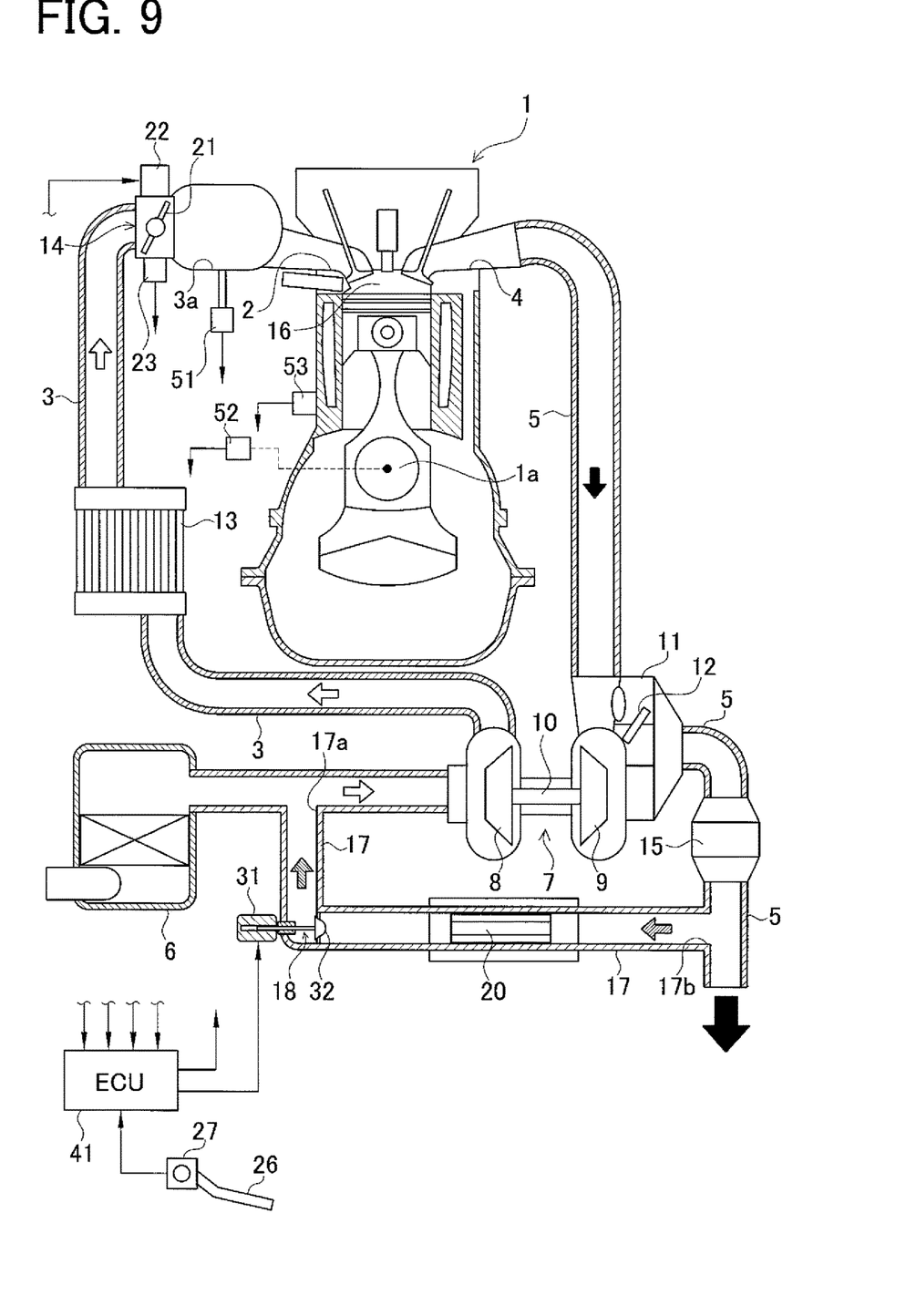
FIG. 9 is a schematic configuration view showing an engine system with a supercharger, the system including an exhaust gas recirculation (EGR) apparatus for engine in a fourth embodiment.

FIG. 9 is a schematic configuration view of an engine system with a supercharger, the system including an EGR apparatus of the present embodiment. The present embodiment differs, as shown in FIG. 9, from each of the above embodiments in placement of the EGR apparatus. In the present embodiment, specifically, the EGR passage 17 is connected, at its inlet 17b, to a part of the exhaust passage 5 downstream of the catalytic convertor 15 and, at its exit 17a, to a part of the intake passage 3 upstream of the compressor 8 of the supercharger 7. Other components are identical to those in the first embodiment.

According to the present embodiment, while the EGR valve 18 is open during operation of the engine 1 and operation of the supercharger 7, the negative pressure resulting from supercharged intake pressure acts on the exit 17a of the EGR passage 17 through the intake passage 3 upstream of the compressor 8, thereby sucking part of exhaust gas flowing in the exhaust passage 5 downstream of the catalytic convertor 15 into the intake passage 3 through the EGR passage 17, EGR cooler 20, and EGR valve 18. Herein, even in a high supercharging region, exhaust pressure on a downstream side of the catalytic convertor 15 is reduced to some extent because of the catalytic convertor 15 acting as a resistance. Thus, it is possible to make the negative pressure by the supercharged intake pressure act on the EGR passage 17 up to the high supercharging region to perform EGR. Since part of exhaust gas cleaned by the catalytic convertor 15 is introduced in the EGR passage 17, the EGR catalytic convertor 19 can be eliminated from the EGR passage 17 as compared with the first embodiment. Other operations and effects in the present embodiment are the same as those in the first embodiment.

The present invention is not limited to each of the above embodiments and may be embodied in other specific forms without departing from the essential characteristics thereof.

In each of the above embodiments, the EGR apparatus of the invention is embodied as the engine 1 with the supercharger 7, but may be applied to an engine having no supercharger.

In the first embodiment, the actual opening degree detecting unit of the invention is exemplified by the ECU 41. As an alternative, a position sensor to detect a stroke position of a valve element of an EGR valve may be provided as the actual opening degree detecting unit.

While the presently preferred embodiment of the present invention has been shown and described, it is to be understood that this disclosure is for the purpose of illustration and that various changes and modifications may be made without departing from the scope of the invention as set forth in the appended claims.

INDUSTRIAL APPLICABILITY

The present invention is utilizable in for example a vehicle engine irrespective of a gasoline engine or diesel engine.

REFERENCE SIGNS LIST

1 Engine
3 Intake passage
3a Surge tank
5 Exhaust passage
16 Combustion chamber
17 EGR passage (Exhaust gas recirculation passage)
18 EGR valve (Exhaust gas recirculation valve)
26 Accelerator pedal (Operating unit)
27 Accelerator sensor (Operation amount detecting unit)
31 Step motor
32 Valve element
33 Valve seat
34 Output shaft
41 ECU (Control unit, Actual opening degree detecting unit)
51 Intake pressure sensor (Load detecting unit)
52 Rotation speed sensor (Rotation speed detecting unit, Load detecting unit)
NE Engine rotation speed
KL Engine load
ACC Accelerator opening degree
TTegr Actual opening degree
Tegr First target opening degree
Tegracc second target opening degree
ΔTAacc Accelerator closing speed
ΔB Predetermined value
ΔB1 Predetermined value
C1 Predetermined value
D1 Predetermined value

The invention claimed is:

1. An exhaust gas recirculation apparatus for an engine, the exhaust gas recirculation apparatus comprising:
   an exhaust gas recirculation passage that allows part of an exhaust gas discharged from a combustion chamber of the engine to an exhaust passage to flow in an intake passage to recirculate back to the combustion chamber;
   an exhaust gas recirculation valve provided in the exhaust gas recirculation passage to regulate a flow rate of the exhaust gas in the exhaust gas recirculation passage;
   an accelerator pedal that operates the engine;
   an accelerator opening degree detector that detects an accelerator opening degree as an operation amount of the accelerator pedal;
   a rotation speed detector that detects a rotation speed of the engine;
   a load detector that detects a load of the engine; and
   an electronic control unit having control logic configured to cause the electronic control unit to control the exhaust gas recirculation valve based on an operating condition of the engine, wherein
   the electronic control unit is further configured to:
       obtain a first target opening degree from a first target opening degree map using the detected rotation speed of the engine and the detected load of the engine;

open the exhaust gas recirculation valve to the first target opening degree;
obtain a second target opening degree from a second target opening degree map using the detected rotation speed of the engine and the detected accelerator opening degree;
detect an actual opening degree of the exhaust gas recirculation valve;
calculate a difference between the actual opening degree of the exhaust gas recirculation valve and the second target opening degree; and
when a difference between the detected actual opening degree of the exhaust gas recirculation valve and the second target opening degree is larger than a predetermined value, the electronic control unit stops controlling the exhaust gas recirculation valve based upon the first target opening degree, and begins to close the exhaust gas recirculation valve before a start of deceleration of the engine.

2. An exhaust gas recirculation apparatus for an engine, the exhaust gas recirculation apparatus comprising:
an exhaust gas recirculation passage that allows part of an exhaust gas discharged from a combustion chamber of the engine to an exhaust passage to flow in an intake passage to recirculate back to the combustion chamber;
an exhaust gas recirculation valve provided in the exhaust gas recirculation passage to regulate a flow rate of the exhaust gas in the exhaust gas recirculation passage;
an accelerator pedal that operates the engine;
an accelerator opening degree detector that detects an accelerator opening degree as an operation amount of the accelerator pedal;
a rotation speed detector that detects a rotation speed of the engine;
a load detector that detects a load of the engine; and
an electronic control unit having control logic configured to cause the electronic control unit to control the exhaust gas recirculation valve based on an operating condition of the engine, wherein
the electronic control unit is further configured to:
obtain a first target opening degree from a first target opening degree map using the detected rotation speed of the engine and the detected load of the engine;
open the exhaust gas recirculation valve to the first target opening degree;
obtain a second target opening degree from a second target opening degree map using the detected rotation speed of the engine and the detected accelerator opening degree;
calculate a difference between the first target opening degree and the second target opening degree; and
when a difference between the first target opening degree and the second target opening degree is larger than a predetermined value, the electronic control unit stops controlling the exhaust gas recirculation valve based upon the first target opening degree, and begins to close the exhaust gas recirculation valve before a start of deceleration of the engine.

* * * * *